Oct. 29, 1968  K. T. BLEUER  3,408,147
PENCIL
Filed July 11, 1967  6 Sheets-Sheet 1

Oct. 29, 1968 K. T. BLEUER 3,408,147
PENCIL
Filed July 11, 1967 6 Sheets-Sheet 2

Oct. 29, 1968  K. T. BLEUER  3,408,147
PENCIL
Filed July 11, 1967  6 Sheets-Sheet 3

Oct. 29, 1968  K. T. BLEUER  3,408,147
PENCIL

Filed July 11, 1967  6 Sheets-Sheet 5

United States Patent Office 3,408,147
Patented Oct. 29, 1968

3,408,147
PENCIL
Keith T. Bleuer, 1042 Kalfahs St.,
Neenah, Wis. 54956
Continuation-in-part of application Ser. No. 622,858,
Jan. 31, 1967, which is a continuation-in-part of application Ser. No. 497,206, Oct. 18, 1965. This application July 11, 1967, Ser. No. 659,267
26 Claims. (Cl. 401—65)

ABSTRACT OF THE DISCLOSURE

A pencil in which lead sticks are propelled successively through the pencil by means of a lead gripper which moves back and forth longitudinally within the pencil and is actuated by means of a rotary member having a spiral surface for contacting and propelling the lead gripper. A spring returns the gripper to an initial lead gripping position when the end of the spiral surface is reached, and the spring also provides a force for engaging the gripper with lead sticks.

---

This application is a continuation-in-part of my co-pending application, Ser. No. 622,858, now abandoned, filed Jan. 31, 1967, which in turn was a continuation-in-part of my application, Ser. No. 497,206, now abandoned, filed Oct. 18, 1965.

The invention relates to writing instruments and more particularly to pencils.

It is an object of the invention to provide an improved pencil having a magazine for sticks of lead or the like, which is located at the upper end of the pencil and from which the lead may be propelled, with one stick of lead following another, to the lower or writing tip of the pencil. It is contemplated that the pencil shall preferably include propelling mechanism for the lead sticks which is actuated from the upper end of the pencil by a manually rotatable element and which shall be operative to move the lead sticks to and through the writing tip a little at a time in accordance with small corresponding rotative movement of the manually rotatable element.

It is another object of the invention to provide an improved pencil of this type having a lead stick gripping element which is actuated to grip a stick of lead for propelling it through the pencil by rotation of the rotatable element and which is subsequently moved toward the pencil tip to correspondingly move the lead stick so gripped. It is still another object of the invention to provide spring means for returning the gripping element to its lead gripping position in the pencil after the gripping element has released a lead stick so that the gripping element may again grip a lead stick for another propelling movement through the pencil, with the gripping element preferably being springingly mounted so that it releases a lead stick just prior to its return movement.

The invention consists of the novel constructions, arrangements and devices to be hereinafter described and claimed for carrying out the above stated objects, and such other objects, as will be apparent from the following description of preferred embodiments of the invention, illustrated with reference to the accompanying drawing, wherein:

Like characters of reference indicate like parts in the several views.

Referring now to FIGS. 1 to 6 of the drawing, the illustrated pencil may be seen to comprise, in general, an outer tubular housing 10 having a pointed tip 11 fixed into it, a tubular element or sleeve 12 rotatably disposed within the housing 10, a magazine 13 for sticks 14 of lead, a lead stick carrying tube 15 fixed to the magazine 13, a tubular carriage 16 longitudinally slidable on the tube 15 and within the element 12 and carrying a lead stick gripping jaw 17, and a compression spring 18 acting on the carriage 16.

Figures 1, 2, 3, 4, 5, 6, 7:
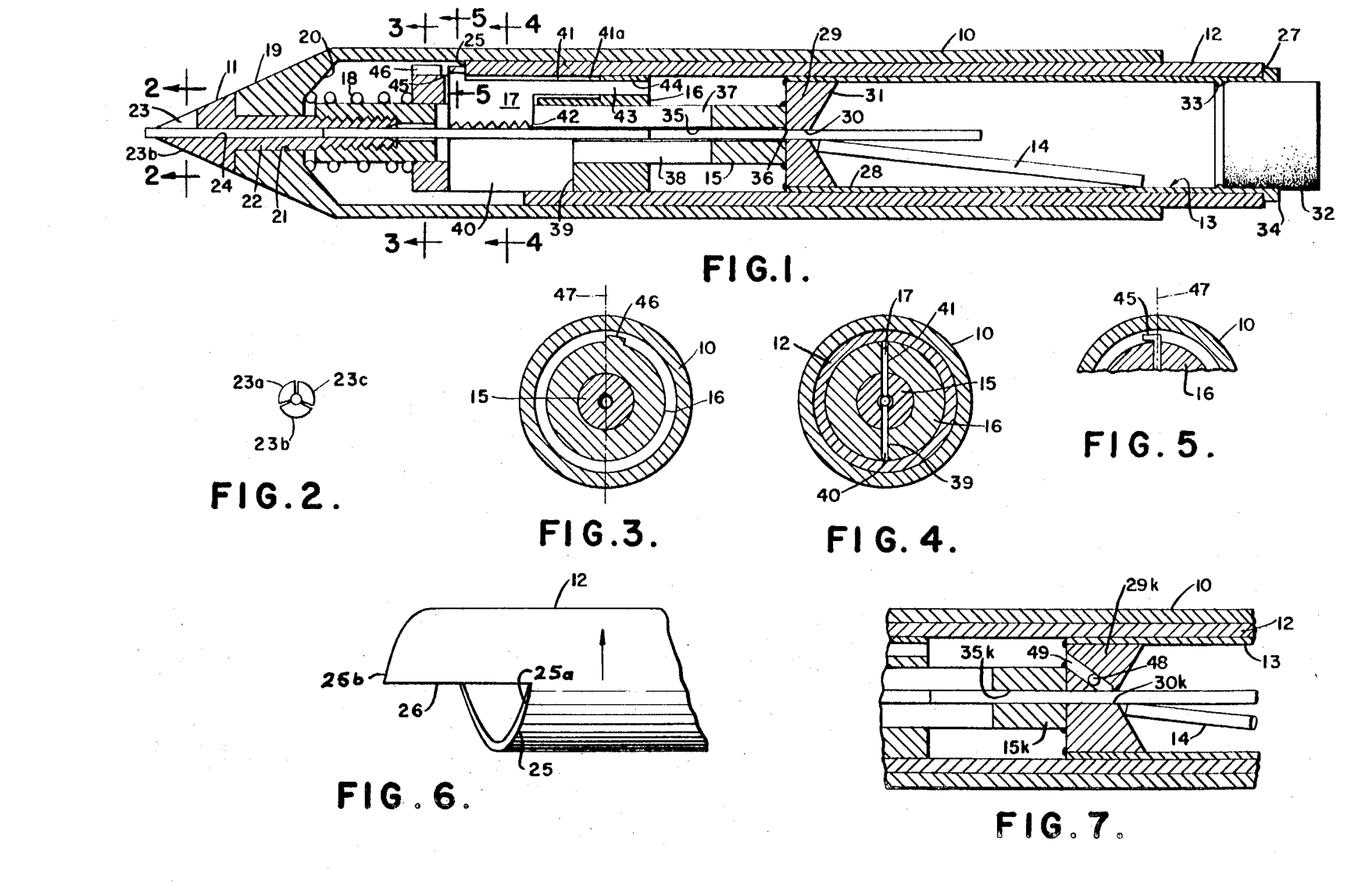
FIG. 1 is a longitudinal, sectional view of a pencil embodying the principles of the invention, and including a manually rotatable, lead advancing, tubular element disposed in an outer cylindrical housing.
FIGS. 2, 3 and 4 are sectional views taken respectively on lines 2—2, 3—3 and 4—4 of FIG. 1.
FIG. 5 is a fragmentary sectional view taken on line 5—5 of FIG. 1.
FIG. 6 is a top plan view of the manually rotatable, lead advancing, tubular element.
FIG. 7 is a fragmentary, longitudinal, sectional view of a modified form of the pencil of the invention.

The housing 10 is formed with a tapered end portion 19 having an inwardly extending internal wall 20 and an axially extending cylindrical opening 21. The tip 11 tapers in the same directions as the end portion 19 of the housing 10 so the outer surface of the tip 11 forms a continuation of the housing portion 19. The tip 11 is formed with a tubular portion 22 which extends through the opening 21 and which has a press fit with the housing 10 for holding the tip fixed with respect to the housing 10. The tip 11 has three slits 23 on its pointed end so as to provide three lead stick gripping jaws 23a, 23b and 23c which surround the bore 24 in the tip 11 and function to grip a stick of lead passing down the bore 24 due to the inherent resilience of the jaws.

The tubular element 12 is rotatably disposed within the housing 10 and is cut on its end with a spiral surface 25 and an axially extending surface 26 which have the same thickness as the element 12. The surface 25 is preferably cut in a left hand spiral as illustrated, and the surface 26 connects the two ends of the spiral surface 25. The tubular element 12 is disposed in the housing 10 with the surfaces 25 and 26 adjacent the pointed end of the housing; and the other end of the element 12 has a plain, cut-off end surface 27 that lies completely in a plane normal to the longitudinal center of the element 12.

The magazine 13 comprises a tubular shell 28 which is fixed to a disc-like element 29 fitting in the shell 28. The element 29 has an opening 30 through it on its axial center and has an inwardly tapering surface 31 tapering inwardly toward the opening 30. An eraser 32 of rubber-like material fits within the element 28, and the shell 28 is provided with an inwardly extending ridge 33 for acting as a stop to prevent further movement of the eraser 32 axially within the shell 28. The shell 28 is provided with a flange portion 34 extending outwardly over the end surface 27 of the element 12 to limit the axial movement of the element 12 with respect to the shell 28.

The tube 15 has an opening or bore 35 disposed, along with the opening 30 and bore 24, on the axial center line of the pencil. The bore 35 is slightly larger in diameter than the opening 30, which is just large enough to allow a stick 14 of writing lead to slide through the opening 30, so that the element 29 provides a shoulder 36 on the end of the opening 30. The tube 15 is fixed with respect to the element 29, as by welding; and the tube 15, on its other end, fits over and has a threaded engagement with the tubular portion 22 of the tip 11. The tube 15 has longitudinal slots 37 and 38 cut into it which are opposite each other and are coextensive axially with respect to each other.

The carriage 16 has a slot 39 cut into it, and a spline 40 is disposed in the slot 39 and fits therein with a press fit. The spline 40 extends through the slot 38 and extends slightly into the bore 35. The carriage 16 has a slot 41 cut into it opposite from the slot 39, and the slot 41 extends through the carriage 16 except for an elongated portion 41a of the slot. The jaw 17 is disposed in the slot 41 and extends through the slot 37 and also slightly into the bore 35 when it is operative to grip a stick of lead as will be hereinafter described. The jaw 17 is provided with a serrated inner edge 42 which is that edge extending into the bore 35 when the jaw is operative for gripping a lead stick. The jaw 17 is formed with a portion 43 of reduced width, and the portion 43 tightly fits in an opening 44 provided in the carriage 16. As will be more clear from a description of operation of the pencil, the jaw is made of spring steel, and the reduced width portion 43 flexes inwardly and outwardly, so that the serrated edge 42 moves inwardly and outwardly of the bore 35, and the reduced width portion 43 is initially formed so that the serrated edge 42 is out of the bore 35 unless external force is applied to the jaw 17 moving the edge 42 into the bore 35.

The jaw 17 is provided with a tang or lug portion 45 on its end opposite the reduced width portion 43, and the lug portion 45 is bent over to slightly overlie the carriage 16 as illustrated in FIG. 5. The carriage 16 is provided with an outwardly extending tang or lug portion 46, and the lug portion 46 is disposed to the right of a central plane 47 through the pencil, beyond the lug portion 45 in this direction, for purposes to be hereinafter made more apparent.

The spring 18 is a simple wire compression spring and is disposed about the tube 15 and between the wall 20 of the housing 10 and the adjacent end of the carriage 16.

In operation, the eraser is removed from the tubular element 28, and a plurality of lead sticks 14 are placed into the magazine 13, so as to load the pencil; and the eraser is then replaced in the tubular element 28 into its illustrated position. The pencil is normally used for writing in a more or less upright or vertical position, with the tip 11 downward; and if hereafter the words downward or downwardly are used, they are used to mean toward or adjacent to the tip 11. The lead sticks 14 enter the opening 30 due to the tapering surface 31 of the element 29, with the pencil being in writing disposition or nearly vertical with the tip 11 downward, and the sticks 14 move down the bore 35 due to the effect of gravity. An initial lead stick 14 will move into contact with the jaw 17 assuming that the jaw is in the bore 35, and if the jaw is out of the bore, the initial stick will move downwardly to the jaws 23a, 23b and 23c followed by other sticks 14 in contact with each other.

The jaw 17 moves into contact with a stick 14 at the upper limit of jaw movement, which is with the spline 40 at the upper end of the slot 38 (upper or upwardly wherever here used mean remote from or away from the tip 11), and the jaw grips the stick between itself and the spline 40, as the tubular element 12 is rotated. On further rotation of the tubular element 12, the carriage 16 together with the spline 40 and jaw 17 then move downwardly with the lead stick still being gripped between the jaw 17 and spline 40 so as to propel the stick and any sticks located farther downwardly in the bores 35 and 24 toward the tip 11. For this operation, the pencil may well be gripped in the writing hand with the housing 10 in particular being gripped in the last three fingers of the hand and with the tip 11 pointed downwardly, and the thumb and forefinger may then be used to turn the portion of the tubular element 12 located at the upper end of the pencil and protruding from the upper end of the housing 10.

As the tubular element 12 is so rotated, assuming that the carriage 16 is at its upward, fully retracted position with the spline 40 at the upper end of the slot 38, the initial or upper end 25a of the spiral surface 25 engages the lug portion 45 of the jaw 17 and moves the serrated inner edge 42 of the jaw into contact with a stick 14 of lead, so that the stick is gripped between the serrated edge 42 and the spline 40. This movement of the jaw 17 is against the resilience of the reduced width portion 43 of the jaw 17 which bends inwardly toward the bore 35 due to the fact that the spiral surface 25 is effective on the lug portion 45 of the jaw which is located farther outwardly than is the reduced width portion 43 at its place of anchorage within the opening 44 of the carriage 16. Additional rotation of the element 12 moves the lead stick 14 gripped between the jaw 17 and spline 40 farther downwardly in the pencil toward the tip 11 with the lug portion 45 riding on the spiral surface 25 and with the carriage 16 being so propelled downwardly against the action of the spring 18. Assuming that there are lead sticks 14 in the bores 35 and 24 ahead or disposed downwardly of the stick gripped by the jaw 17, the lowermost stick 14 will be moved farther outwardly out of the tip 11 so that more of it protrudes from the tip for writing purposes. The lead stick 14 protruding from the tip 11 is gripped by the three jaws 23a, 23b and 23c so that it does not move laterally with respect to the tip 11 and so that there is no lost motion between it and the tip for a good writing action. This pencil, like most pencils, is gripped between the first two fingers and the thumb of the writing hand when used for writing. Since the spiral surface 23 is continuous from one end 25a to the other end 25b, it is apparent that the lead stick gripped by the jaw 17 and those ahead of this particular stick in the bores 35 and 24 may be moved downwardly in the pencil as much or as little as desired, depending on the degree of rotation given the tubular element 12. The forward movement of the carriage 16, jaw 17 and spline 40 caused by rotation of the tubular element 12 and spiral surface 25 is against the action of the spring 18, and it will thus be apparent that the spring 18 in tending to force the carriage 16 upwardly causes a forceful bearing of the lug portion 45 of the jaw 17 on the spiral surface 25 and thus causes the jaw 17 to forcefully grip a stick of lead between it and the spline 40, so that backward slippage of the lead stick due to writing pressure on the lead stick protruding from the tip 11 cannot occur. Backward rotation of the element 12, due to the force of the lug portion 45 bearing on the spiral surface 25 caused by the spring 18, cannot occur due to the friction of the element 12 on the flange portion 34 of the shell 28 which is stationary with respect to the housing 10.

As the lead stick protruding from the tip 11 is used, the lead sticks within the bores 35 and 24 are advanced as needed by rotation of the element 12 so that there is always a satisfactory length of lead protruding from the tip 11 for writing; and finally the lug portion 45 will have traversed the complete length of the spiral surface 25, so that the lug portion 45 rests on the lower end 25b of the surface 25. Under these conditions, if the tubular element 12 is rotated slightly, the lug portion 45 will travel off the end 25b of the spiral surface 25 and will travel upwardly along the axially extending surface 26 of the tubular element 12. Since the element 12 at this time does not bear on the lug portion 45, the jaw 17 springs back outwardly out of the bore 35 and releases the lead stick that is between it and the spline 40, this movement of the jaw 17 being due to the resilience of the reduced width portion 43 of the jaw 17. The upward or return travel of the carriage 16 and jaw 17 is due to the action of the spring 18, which is always tending to move the carriage 16 in this direction. A complete return of the carriage 16 to its uppermost limit of movement does not, however, take place without a slight additional rotation of the tubular element 12, due to the presence of the tang 46 provided on the carriage 16 which strikes the end 25b of the spiral surface 25 as the carriage 16 begins its upward movement and as the lug portion 45 moves off the end 25b of the surface 25 and onto and along side of the axially extending surface 26 of the element 12. The tang 46 thus causes a hesitation of the carriage 16 in its upward movement, as the element 12 is rotated, and assures that the jaw 17 can spring completely out of engagement with the lead stick between it and the spline 40 as the carriage 16 makes its upward movement which is into substantial contact with the disc-like element 29. The pencil is assumed to be in substantially vertical position, as above described in the writing hand, with the thumb and forefinger acting to turn the element 12 when the carriage 16 makes its return movement, so that the lead sticks 14 remain in end to end contact in the bores 35 and 24. After the carriage 16 has returned to the upper limit of its movement, a slight additional rotation of the element 12 causes the jaw 17 to engage with the lead stick between it and the spline 40 and to move it toward the tip as has been above described.

With respect to an initial lead stick within the bore 35, it will be apparent that it will follow the jaw 17 downwardly as the carriage 16 moves downwardly and that it and additional lead sticks will drop downwardly in the bores 35 and 24 when the jaw 17 returns to retracted position due to its own resilience. The lug portion 45 is bent over to slightly overlie the carriage 16 as illustrated in FIG. 5 so that the spiral surface 25 remains effective on the lug portion 45 even though there is no lead stick at the time between the jaw 17 and the spline 40, and the jaw 17 might otherwise enter too far into the bore 35. The shoulder 36 functions to tend to prevent upward movement of lead sticks in the bores 35 and 24 when the pencil is upended as when erasing, assuming that the jaw 17 is at the time out of engagement with a lead stick.

The embodiment of the invention illustrated in FIG. 7 is substantially the same as the previously described embodiment, differing mainly from the latter in substituting small balls 48 for the shoulder 36. In the FIG. 7 embodiment, the bore 35k has the same diameter as the diameter of the opening 30k of the disc-like element 29k that corresponds to the element 29 in the first embodiment, and the diameters of the bore 35k and opening 30k are just sufficient to allow a stick of lead to slide through them easily. The balls 48 are disposed in bores or openings 49 in the disc-like element 29k which are drilled into the element 29k from its end to which the tube 15k is fixed, so that the openings 49 extend from the opening 30k toward the tip 11 and at acute angles with respect to the central axis of the pencil. In order to provide for the balls 48 and openings 49, the element 29k is made slightly thicker than the element 29 as is apparent from the drawing. The openings 49 are drilled into the opening 30k slightly, and the openings 49 are blocked at their outer ends by any suitable means, such as by welding that is used to fix the element 15k to the element 29k. There may be a plurality of balls 48 and openings 49—there may be, for example, 3 balls and 3 openings, equally spaced circumferentially about the element 29k.

The FIG. 7 embodiment functions the same as the first described embodiment except that the balls 48 take the place of and function in place of the shoulder 36. When the FIG. 7 embodiment is upended as when erasing, the balls 48 will move down the bores 48 and will engage with a stick of lead in the opening 30k, thus preventing the lead stick from moving by gravity out of the bore 35k and back into the magazine 13. Since each of the three bores 49 extend generally downwardly of the pencil toward the tip 11 and lie at an acute angle with respect to the longitudinal axis of the pencil, it will be apparent that one or two of the balls 48 will travel down its bore and into contact with the lead stick in the opening 30k before the pencil passes through a horizontal position in being upended from a generally vertical position with the tip 11 downward, so that these balls grip the lead stick in the opening 30k before gravity is effective to tend to return the stick into the magazine 13.

The length of the longitudinally extending surface 26 on the rotatable element 12 is slightly greater than the distance of retracting travel of the carriage 16 in returning to its fully retracted position substantially in contact with the disc-like element 29 or 29k from its fully extended position which is illustrated in FIG. 1 or FIG. 7. Therefore the end 25a of the spiral surface 25 does not make immediate contact with the lug portion 45 when the carriage 16 snaps back to its fully retracted position under the action of the spring 18, and a slight additional rotation of the element 12 is necessary to cause the spiral surface 25 to make contact with the lug portion 45 to move the jaw 17 into contact with a lead stick 14 in the bore 35 or bore 35k. Therefore, the lead stick engaging movement of the jaw 17 is under manual control rather than under control of the spring 18 which would cause an engagement of the lead stick by the jaw 17 with a greater shock and with a possible breakage of the lead stick.

The carriage 16 moves back to its fully retracted position with a snap due to the action of the spring 18, and the resulting jar helps in feeding the lead sticks downwardly in the bores 35 and 35k due to their own weight. As above explained, the pencil is preferable in a vertical position at this time, with the tip 11 downward. Advantageously, the spring 18 also assures that a lead stick 14 is firmly gripped by the jaw 17 whenever the lug portion 45 is in contact with the helical surface 25, since the spring 18 tends to force the carriage 16 upwardly, while this is resisted by the jaw 17 bearing on the spiral surface 25, causing the jaw 17 to bend and swing inwardly into the bore 35 or 35k into tight engagement with the lead stick. The spring 18 causing the lug portion 45 and tang 46 to travel with a snap action along the longitudinally extending surface 26 in retracting movement of the carriage 16 also assures that there is little lost motion of the rotatable element 12 and that most of the rotation of the element 12 for its 360 degrees of turn is effective to actually propel a lead stick downwardly out of the tip 11.

The primary difference between the embodiments of the invention previously described and that illustrated in FIGS. 8–18 is that, in the latter form of the invention, the manually rotatable element is turned a plurality of turns for moving the lead gripping element forwardly through the pencil, while in the first described embodiments only a single turn of the manually rotatable element is utilized before a return movement of the lead gripping element occurs. Therefore, advantageously, with the embodiment of the invention illustrated in FIGS. 8–18, there is less loss motion of the manually rotatable element in propelling the lead sticks through the pencil, although the first described embodiments are advantageously very simple.

The modified form of pencil illustrated in FIGS. 8–18 comprises an outer tubular housing or barrel 60 having a pointed tip 61 extending into it, a tubular element or sleeve 62 rotatably disposed within the housing 60, a magazine 63 for sticks 64 of writing lead, a lead gripper 65 which moves longitudinally back and forth within the tubular element 62, a guide element 66 for the gripper 65, a lead stick carrying tube 67 which telescopes into both the guide element 66 and also into the tip 61, a gripper bracing element 68 which moves longitudinally back and forth in the pencil along with the gripper 65 and a compression spring 69 effective between the tip 61 and the gripper 65.

Figures 8A, 14, 15, 16:
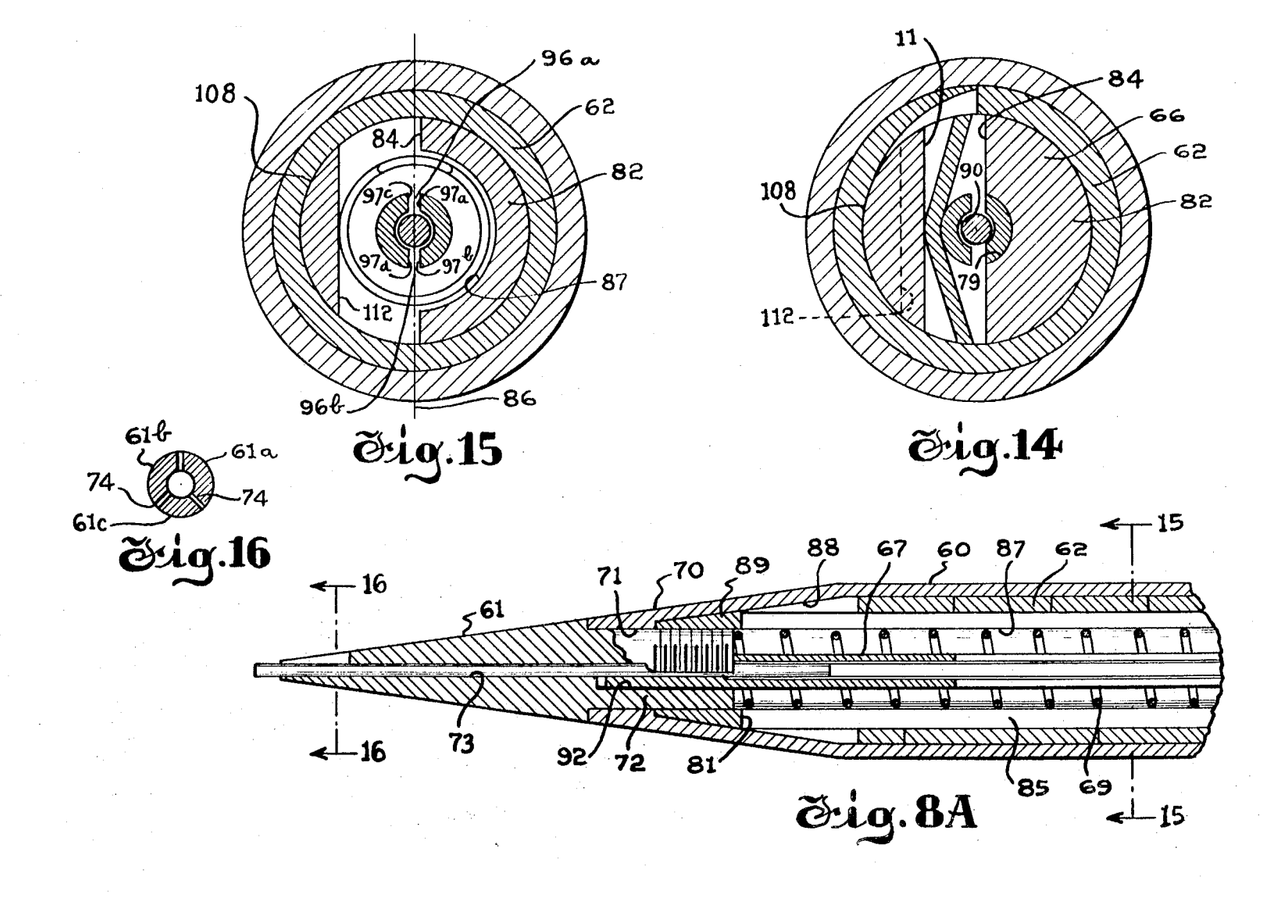
FIG. 8A is a longitudinal sectional view of the lower or writing end of still another modification of the pencil of the invention.
FIGS. 11, 12, 13, 14, 15 and 16 are respectively sectional views taken on an enlarged scale on lines 11—11, 12—12, 13—13, 14—14, 15—15 and 16—16 in FIGS. 8A and 8B.

The housing 60 is formed with a tapered end portion 70 and an axially extending cylindrical opening 71. The tip 61 tapers in the same direction as the end portion 70 of the housing 60 so that the outer surface of the tip 61 forms a continuation of the housing 60. The tip 61 is formed with a tubular portion 72 which extends through the opening 71, and the tubular portion 72 is externally threaded for purposes to be hereinafter described. The tip 61 has a lead bore or duct 73 extending longitudinally through it, and the tip 61 has 3 slits 74 on its pointed end so as to provide 3 lead stick gripping jaws 61a, 61b, and 61c which surround the bore 73 in the tip 61 and function to grip a stick of lead passing down the bore 73 due to the inherent resilience of the jaws.

Figure 8B:
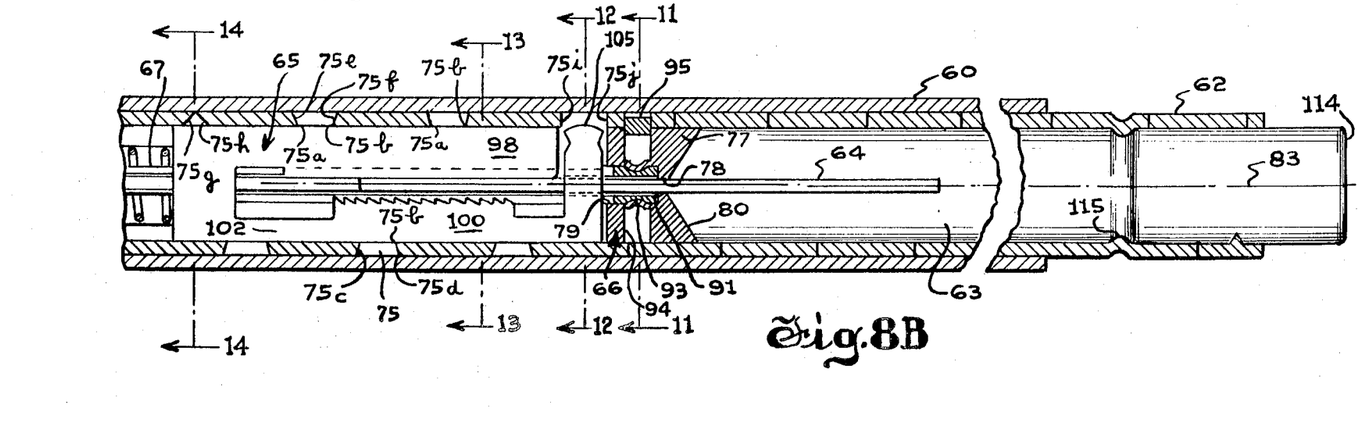
FIG. 8B is a longitudinal sectional view of the upper or other end of this modification of the invention, this modification of the invention including a lead stick gripper movable longitudinally within the pencil, a manually rotatable lead advancing tubular element disposed in an outer cylindrical pencil housing and having a slot in it for receiving a part of the lead gripper, and a bracing element for the lead gripper.
Figures 9, 10, 17, 18:
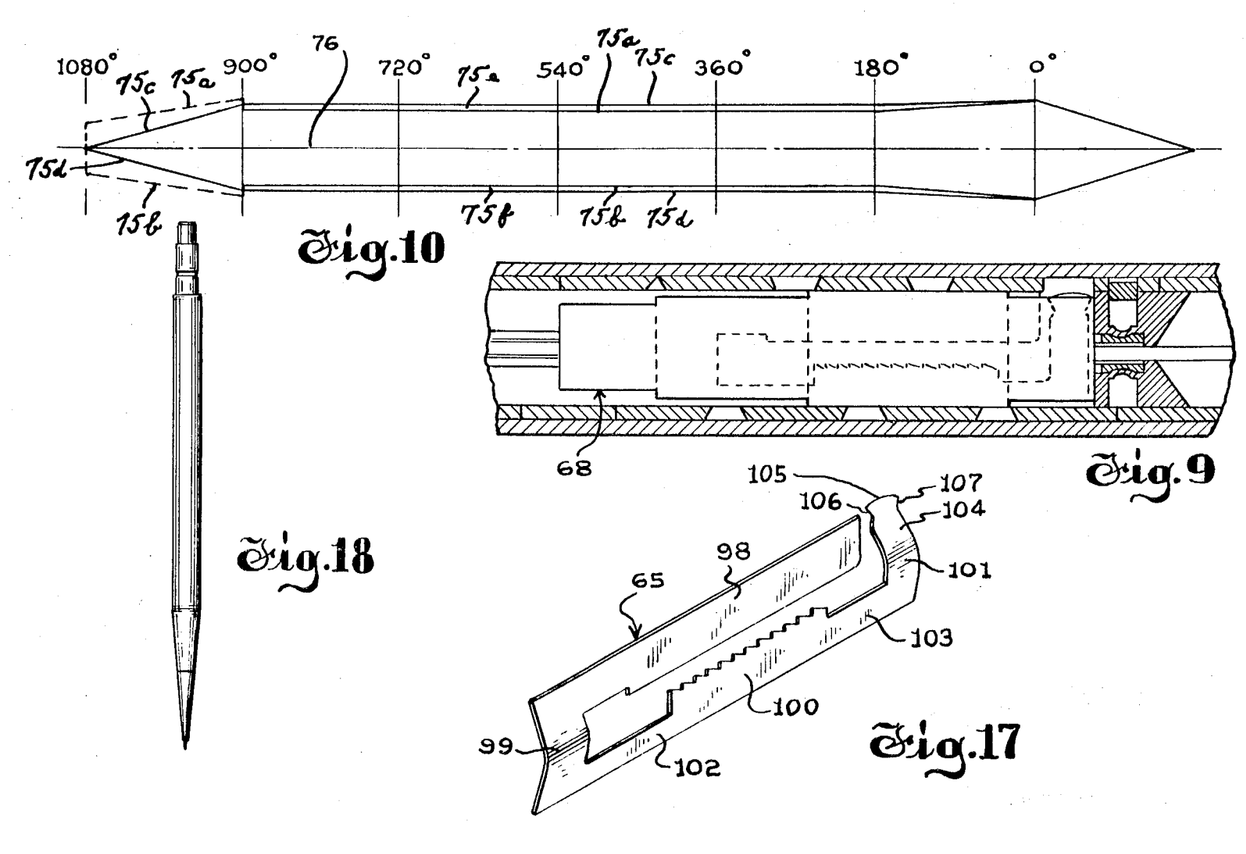
FIG. 9 is a longitudinal sectional view of a portion of this modification of the pencil and similar to FIGS. 8A and 8B but with the lead gripper bracing element included in elevation in the view.
FIG. 10 is a developed plan view of the slot in the lead advancing tubular element of this modification as seen from the exterior of the tubular element.
FIG. 17 is a perspective view of the lead stick gripper.
FIG. 18 is an elevational view of the pencil.
Figure 11:
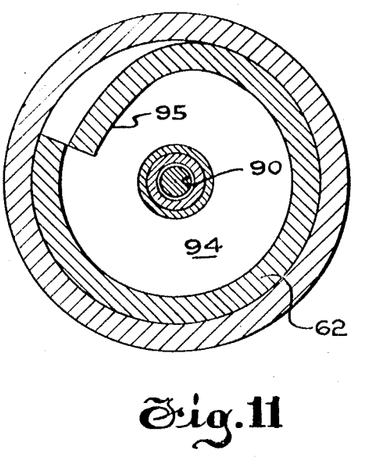
Figure 12:
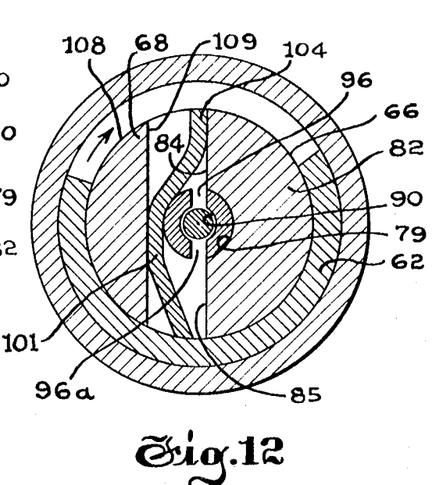
Figure 13:
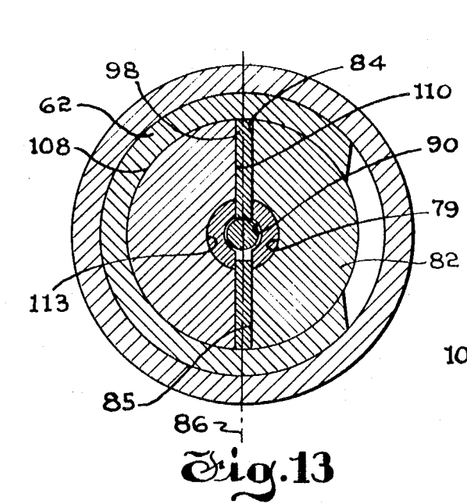

The tubular element 62 is rotatably disposed within the housing 60 and protrudes slightly from the upper end of the housing 60 so that the tubular element 62 may be easily rotated with respect to the housing as for example by means of the thumb and forefinger of a person's hand which holds the pencil between the other fingers of the hand and the palm. The rotatable element 62 is formed with a helical slot 75 within it. The slot has inner edges 75a and 75b and outer edges 75c and 75d. For the greatest part of the length of the slot 75, the edges 75a and 75b are closer together than are the edges 75c and 75d so as to define outwardly flaring sides 75e and 75f of the slot 75. At the lower end of slot 75, the outer edges 75c and 75d are brought together, and the inner edges 75a and 75b are brought closer together but are still spaced from each other, so as to define the inwardly flaring sides 75g and 75h. At the upper end of the slot 75, the inner edges 75a and 75b are the same distance apart as are the outer edges 75c and 75d so as to define the radially extending slot sides 75i and 75j. FIG. 10 is a developed view of the slot 75 as it appears from the exterior of the tubular element 62. The slot 75 extends around the tubular element 62 for substantially 3 turns or 1080°, and the 0° or upper end position is considered to be at the right end of the slot 75 as it is seen in FIG. 8B between the radially extending surfaces 75i and 75j, and the lower 1080° position or lower end of the slot 75 is considered to be at the left hand end of the groove 75 as it is seen in FIG. 8B, between inwardly flaring surfaces 75g and 75h. As it will be observed from FIG. 10, the slot 75 is slightly wider at the 0° position, between the slot sides 75i and 75j, than at other immediately subsequent positions about the slot. From the 0° position (at the upper right hand end of the slot 75 between the surfaces 75i and 75j as seen in FIG. 8B), the outer edges 75c and 75d taper inwardly toward the slot center line 76 (which extends helically about the tubular element 62), and the inner edges 75a and 75b taper inwardly to a still greater extent, this tapering of both the inner and outer edges of the slot being from the 0° position to the 180° position which coincides with the right hand showing of the slot 75 at the lower periphery of the tubular element 62 as it is seen in FIG. 8B. The distances between the edges 75a and 75b and the distances between the edges 75c and 75d remain uniform so as to provide the outwardly flaring sides 75e and 75f from the 180° position to the 900° position of the slot which corresponds to the left hand showing of the slot in the lower periphery of the element 62 as the element 62 is seen in FIG. 8B. Between the 900° position and the 1080° position, the outer edges 75c and 75d taper inwardly to the slot center line 76. The inner edges 75a and 75b are widened at the 900° position to have about the same spacing as at the 0° position and from 900° to 1080° taper inwardly also but to a less extent as is shown in FIG. 10.

Preferably the tubular element 62 is formed from a single strip of sheet metal which is bent about a cylindrical mandrel (not shown) into tubular form, and the slot sides 75e to 75j are formed on the edges of the metal strip prior to bending the strip into tubular form about the mandrel with the slot 75 being provided between convolutions of the strip. The side edges of the strip forming the tubular element 62 in the portions of the tubular element 62 outside of the slot 75, that is, both above and below the slot 75, preferably have their side edges fixed together, as by welding, so as to form a relatively rigid element.

The guide element 66 has a cylindrical end portion 77 at its upper end fitting within the rotatable element 62. The end portion 77 is provided with a central opening 78 therethrough which is only slightly larger in diameter than the diameter of a lead stick 64, and the guide element 66 is provided with a larger diameter central bore 79 in communication with and below the opening 78. The portion 77 has an inwardly tapering surface 80 tapering inwardly toward the opening 78, and the surface 80 forms the lower surface of the magazine 63 for lead sticks and serves to funnel the lead sticks into the opening 78 when the pencil is held substantially vertically with its tip 61 down in the usual operating position of the pencil. The guide element 66 is provided on its lower end with a tubular portion 81, and the portions 77 and 81 are connected by an intermediate semi-tubular portion 82 which has the same outer diameter with respect to the center line 83 of the pencil as do the portions 77 and 81 but has radially extending surfaces 84 and 85 adjacent but spaced from the longitudinally vertical plane 86 through the pencil. The bore 79 extends centrally and longitudinally of the element 66 for approximately ½ the length of the portion 82, and the bore 79 then enlarges into a larger diameter bore 87 which extends to the lower end of the element 66 and through the portion 81. The portion 81 is internally threaded in the bore 87, and the externally threaded portion 72 of the tip 61 is screw threaded into the portion 81 so as to hold the tip 61 and the guide element 66 with respect to the housing 60. The housing 60, in this connection, is provided with an inside tapered surface 88, and the portion 81 of the guide element 66 is provided with a correspondingly tapered surface 89 which fits within the housing 60 as shown in FIG. 8A.

The lead carrying tube 67 fits at one end in the bore 79 within the cylindrical portion 77 of the element 66, and the tube 67 has an internal bore or duct 90 which is slightly larger in diameter than the diameter of the opening 78, so as to form an inwardly extending shoulder 91 at the lower end of the opening 78 for tending to prevent the return movement of lead sticks out of the bore 90 back into the magazine 63 when the pencil is upended for any reason. The tube 67 at its lower end fits into the cylindrical bore 92 formed within the tip 61, and the bore 90 decreases in diameter slightly toward its lower end, as will be noted from FIG. 8A, so that the bore 90 at its lower end has substantially the same diameter as the bore 73 in the tip 61.

The tube 67 is provided with an external peripheral groove 93, and the guide element 66 is provided with a peripheral groove 94, and the element 66 at the bottom of the groove 94 is deformed so that it enters the groove 93 and thus fixes and interlocks the tube 67 within the guide element 66. The tubular element 62 is provided with an inwardly extending tang 95 which extends into the groove 94 in the guide element 66 so as to fix the rotary element 62 from longitudinal movement with respect to the guide element 66 and thereby with respect to the tip 61 and also with respect to the housing 60 due to the threaded connection between the guide element 66 and the tip 61. The tube 67 is provided with longitudinally extending slots 96a and 96b therein, and side edges 97a and 97b of the slots 96a and 96b are in alignment with or are in the same plane extending longitudinally of the pencil as are the surfaces 84 and 85.

The gripper 65 is preferably stamped from a single piece of spring steel strip and comprises an anvil portion 98 extending through the slot 96a and slightly into the bore 90, a bridging portion 99 extending around the tube 67, a toothed or jaw portion 100 extending into the slot 96b and nearly into the bore 90 in the illustrated position of the gripper 65 in FIG. 8B and a bridging tang portion 101 extending around the tube 67 back to the same side of the tube as the portion 98. Connecting portions 102 and 103 connect the toothed portion 100 with the portions 99 and 101, and it will be noted that the portion 102 is longer and is of less width than the portion 103 for purposes to be hereinafter described. The portion 100 has a flat end 104 that has surface to surface contact with the flat surface 84 of the guide element 66, and the end 104 has a circular outer end surface 105 and has outwardly flaring surfaces 106 and 107. The end 104 is less in width longitudinally of the pencil than the width of the slot 75 between the surfaces 75i and 75j but is of greater width than the distance between the edges 75a and 75b between the 180° and 900° positions of the slot 75 so that the tang portion 101 may enter the slot between the surfaces 75i and 75j but cannot enter the slot between the surfaces 75e and 75f from 180° to 900° of the slot 75. The gripper 65 is so formed that it has an inherent resiliency particularly in the connecting portion 102 tending to move the end 104 outwardly, as the gripper 65 is illustrated in the figures, so as to move the end 104 into the slot 75 when the end 104 is in alignment with the portion of the slot at 0°, that is, between the radially extending surfaces 75i and 75j.

The bracing element 68 has a cylindrical outer surface 108 in contact with the inner surface of the tubular element 62 and has plane surfaces 109, 110, 111, and 112 and an internal cylindrical surface 113. The surfaces 10 are in alignment or are in the same longitudinal plane as the side surfaces 97c and 97d of the grooves 96a and 96b in the lead carrying tube 67 and are spaced slightly from the longitudinal plane 86, and the surfaces 109 and 111 are respectively in contact with and brace the portions 101 and 99 of the gripper 65. The surface 113 is in sliding contact with the outer surface of the tube 67.

The spring 69 extends between the lower end of the gripper 65 and the upper end of the tip 61. The spring 69 is disposed in the bore 87 of the guide element 66, and the surface 112 of the bracing element 68 extends for a part of the length of the spring and is in contact with the spring.

The magazine 63 is closed by means of an eraser 114 of rubber-like material which fits within the rotatable element 62. An inwardly extending ridge 115 is formed within the rotatable element 62 for the purpose of limiting the inward movement of the eraser 114 with respect to the rotatable element 62.

In operation, the eraser 114 is removed from the rotatable element 62, and a supply of lead sticks 64 is inserted into the magazine 63. The lead sticks 64, with the pencil being in its usual vertical position with the tip 61 down, move into the opening 78 successively and move into the bore 90 of the lead carrying tube 67, this movement of the leads being due to the effect of gravity. The toothed portion 100 of the gripper 65 is in a position in the slot 75 96b and outside of the bore 90, and the portion 100 thus does not engage any lead sticks 64 in the bore 90 as the gripper 65 makes a return movement upwardly in the pencil into its illustrated position, as will hereinafter be described. Lead sticks 64 thus are within the bore 90 down to the tip 61. The gripper 65, as has been previously described, is inherently biased so that the tang portion 101 springs outwardly whereby the tang end 104 moves outwardly and into the widest portion of the slot 75, which is that portion of the slot between the sides 75i and 75j, assuming that the rotatable element 62 is in or is moved to its rotative position shown in FIGS. 8A and 8B. This movement of the gripper 65 is a general pivoting movement about the relatively flexible gripper portion 102; and, as the tang portion 101 moves into the slot 75, the toothed portion 100 enters the bore 90 and grips a lead stick 64 between it and the opposite anvil portion 98 of the gripper 65. On further rotation of the rotatable element 62, as by means of the thumb and forefinger of the hand holding the pencil, the tang portion 101 moves downwardly in the slot 75 and thus moves the gripper 65 downwardly in the pencil, with the anvil portion 98 and the toothed portion 100 moving in the slots 96a and 96b and being braced by the surfaces 84 and 85 and thus being held from rotation along with the rotatable element 62. A lead stick 64 thus gripped between the toothed portion 100 and the anvil portion 98 is thus propelled down the bore 90 of the tube 67 and propels the lead sticks in front of it and causes the lead stick at the lower end of the tip 61 to be moved farther outwardly or downwardly with respect to the tip 61 to provide an additional length of lead for writing purposes. This movement of the gripper 65 is against the compressing action of the spring 69; and, in view of the fact that the force from the upper surfaces 75j and 75f of the slot 75 is on the opposite side of the lead tube 67 with respect to the part of the gripper 65 that flexes, namely the portion 102, the force due to the spring 69 tending to move the gripper 65 upwardly in the pencil has the action of causing a tight gripping of the lead stick between the toothed portion 100 and the anvil portion 98 of the gripper. As the tang portion 101 moves from the radially extending surface 75j to the outwardly flaring surface 75f of the slot 75, with rotation of the element 62, the outwardly flaring side 75f of the slot acting on the outwardly flaring edge 107 of the tang portion 101 also has a cam action which tends to move the tang portion 101 outwardly and increase the force of the toothed portion 100 on a lead stick between the toothed portion and the anvil portion 98. In view of the fact that the curved end 105 of the tang portion 101 is greater in width than the distance between the edges 75a and 75b of the slot 75, it will be apparent that the tang portion 101 cannot move out of the slot 75 after the tang portion once enters between the flaring surfaces 75e and 75f of the slot 75.

As the lead is used, the rotatable element 62 will be rotated more and more, for a rotation up to 3 turns, and during these continued turning movements of the element 62, the lead sticks 64 in the bore 90 are moved farther and farther toward the end of the tip 61; and additional lead sticks keep feeding from the magazine 63 into the opening 78 and into the bore 90, so that the bore 90 is maintained full of lead sticks from the magazine 63.

After a rotation of 900°, that is, 2½ turns from the position of the rotatable element 62 as illustrated in FIGS. 8A and 8B, the tang portion 101 reaches the part of the slot 75 at which the sides of the slot change from an outwardly flaring disposition to an inwardly flaring disposition, that is, from the outwardly flaring sides 75e and 75f to the inwardly flaring sides 75g and 75h. About midway between the 900° and the 1080° positions of rotation of the element 62, the tang portion 101 is forced out of the slot 75 inwardly toward the center line 83 of the pencil, particularly by the inwardly flaring sides 75g and 75h acting on the curved end surface 105 of the tang portion 101; and the tang portion 101 thus disengages from the slot 75. This same movement, with most of the pivoting movement of the tang portion 101 taking place in the relatively thin portion 102 of the gripper 65, causes the toothed portion 100 to move out of the bore 90 so as to cause the toothed portion to disengage with respect to any lead sticks 64 within the bore 90. Since the sides of the slot 75 are no longer effective to hold the gripper 65 against upward movement toward the magazine 63, the gripper 65 snaps upwardly at this time under the action of the spring 69, during all of this movement being out of engagement with lead sticks within the bore 90, with the curved end surface 105 ratcheting and sliding over the inner surface of the rotatable element 62 and the slot edges 75a and 75f. The tang portion 101 cannot enter the slot 75 on this return movement of the gripper 65 due both to the curved end 105 ratcheting in a snap action across the slot 75 and also due to the fact that the tang portion 101 is wider than the distance between the slot edges 75a and 75b. On a slight additional rotation of element 62, the 0° portion of the slot 75, which is between the radially extending surfaces 75i and 75j, is again in register with the tang portion 101, and the tang portion again moves outwardly into the slot 75 due to the resilience of the reduced thickness 102 of the gripper 65; and the toothed portion 100 again engages with lead sticks between it and the anvil portion 98 so that the lead propelling action of the gripper 65 on lead sticks engaged by the gripper 65 may again be repeated.

The bracing element 68 during this reciprocating movement of the gripper 65 travels with the gripper 65 and braces the portions 98, 100, 99 and 101, so that undue sideward movement of these portions cannot take place. The surface 112 also acts to hold the upper end of the spring 69 in proper position. The bracing element 68 may be omitted if desired, so that the only reciprocal carriage within the pencil is the gripper 65; however, the use of the bracing element 68 is preferred.

The embodiment of the invention illustrated in FIGS. 19A, 19B, and 20 to 25 is quite similar to that illustrated in FIGS. 8 to 18 and differs from the embodiment shown in FIGS. 8 to 18 mainly in that it is somewhat simplified in construction.

The modified form of pencil illustrated in FIGS. 19 to 25 comprises an outer tubular housing or barrel 125, a tubular element or sleeve 126 rotatively disposed within the housing 125, a magazine 127 for sticks 128 of writing lead, a lead gripper 129 which moves longitudinally back and forth within the tubular element 126, a guide element 130 which fits within the tubular element 126 and within the outer barrel 125, a lead stick carrying tube 131 which is disposed within the guide element 130, a compression spring 132 effective between a part of the guide element 130 and the gripper 129, and a pocket clip 133 which not only is for the purpose of holding the pencil within the user's pocket but also holds parts of the pencil together.

Figure 19A:
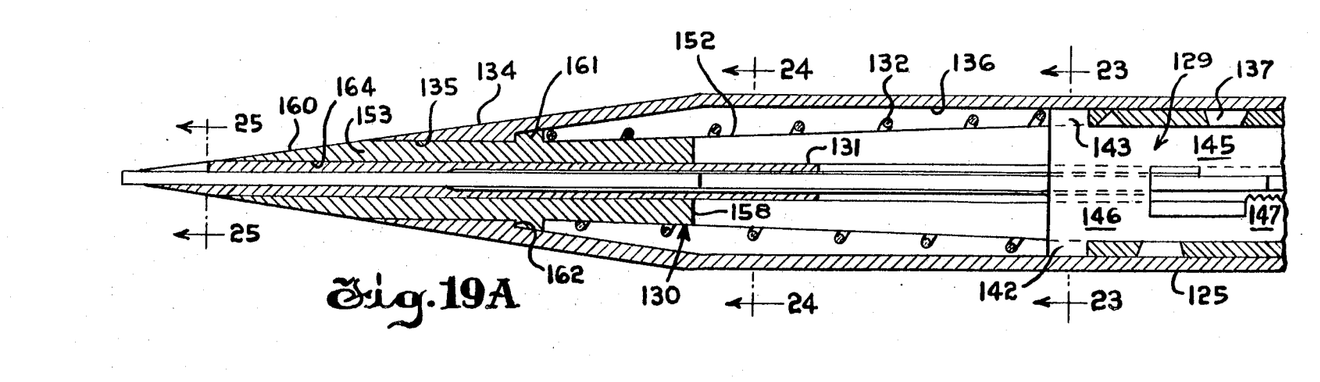
FIG. 19A is a longitudinal sectional view of the lower or writing end of still another modification of the pencil of the invention.

The barrel 125 corresponds to the barrel 60 in the previously described embodiment and has an inwardly tapering tip portion 134 with a cylindrical opening 135 therethrough. The barrel 125 has an internal cavity 136 which is cylindrical and is of uniform cross-section for most of the length of the barrel 125.

Figure 19B:
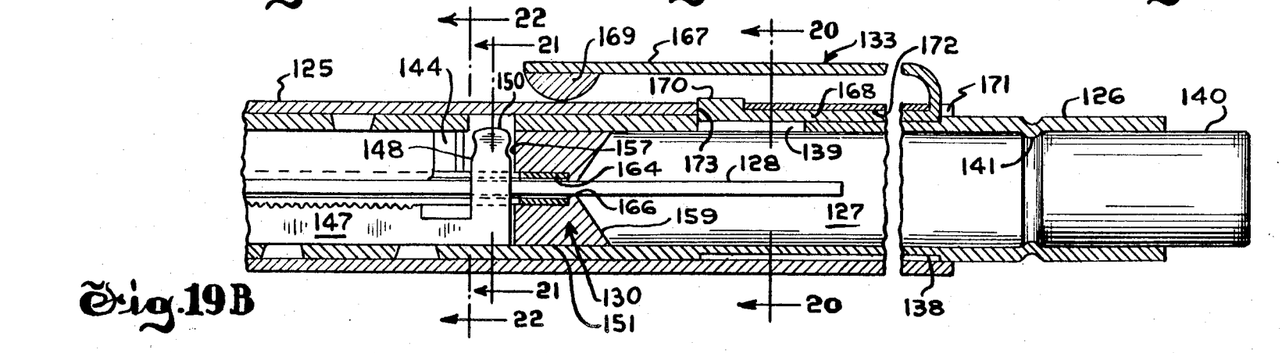
FIG. 19B is a longitudinal sectional view of the upper or other end of this modification of the invention.
Figure 20:
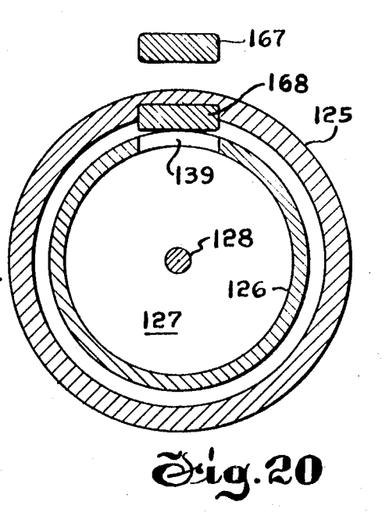
FIGS. 20, 21, 22, 23, 24 and 25 are respectively sectional views taken on an enlarged scale on lines 20—20, 21—21, 22—22, 23—23, 24—24 and 25—25 in FIGS. 19A and 19B.
Figure 21:
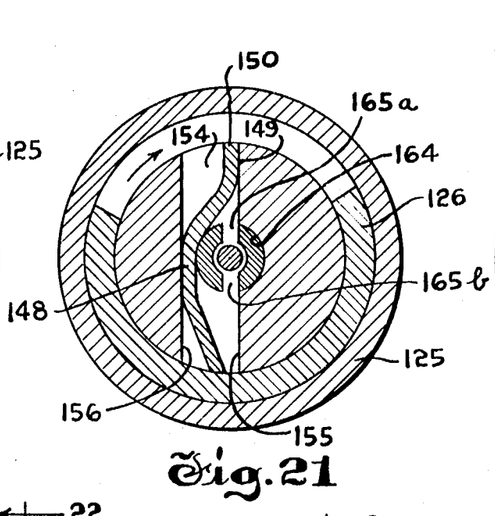
Figure 22:
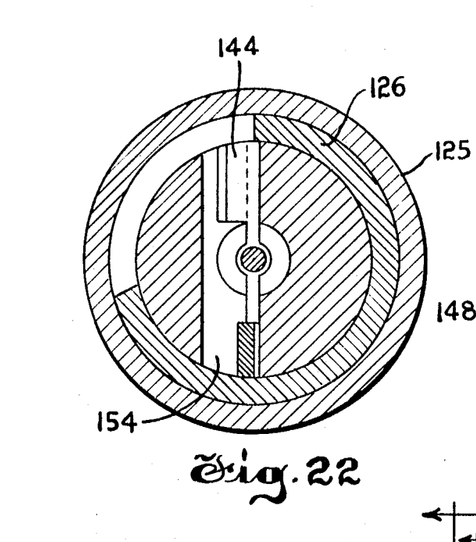
Figure 23:
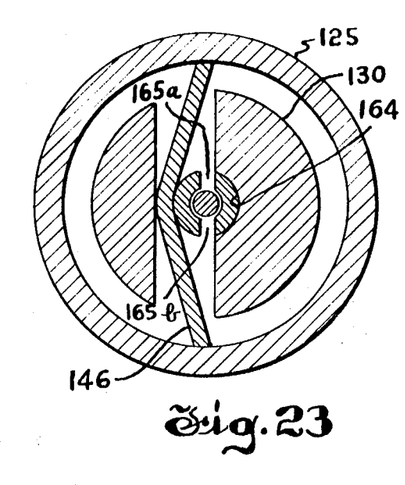
Figure 24:
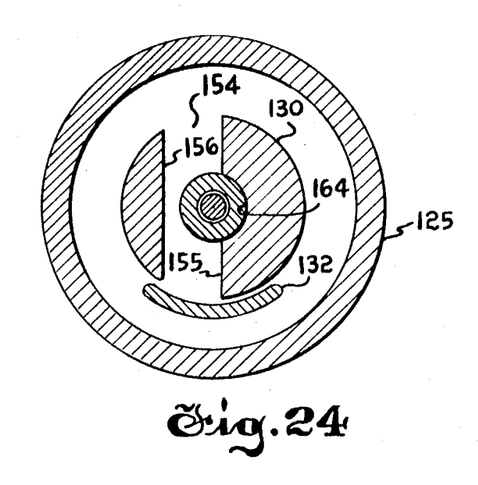
Figure 25:
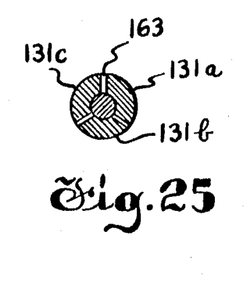

The rotatable sleeve 126 corresponds to the sleeve 62 in the previously described embodiment and differs principally from the sleeve 62 in that the sleeve 126 is considerably shorter. The sleeve 126 is rotatably disposed within the cylindrical cavity 136 of the barrel 125, and the rotatable sleeve 126 is provided with a helical slot 137 in it which is identical with the helical shot 75 in the previously described embodiment. It will be noted that the rotatable sleeve 126 is illustrated as being formed from an integral piece of material and that the sleeve 126 terminates, at its lower end, adjacent to the lower end of the helical slot 137. The rotatable sleeve 126 is provided with a peripheral groove 138 adjacent its upper end but located completely within the housing 125 and is also provided with a rectangular opening 139 extending through it and in communication with the peripheral groove 138. The groove 138 and opening 139 co-operate with the clip 133 in a manner as will be hereinafter described. A rubber eraser 140 extends into the rotatable sleeve 126 at its upper end and thereby closes the magazine 127, and the sleeve 126 is provided with an inwardly extending ridge 141 for limiting the downward movement of the eraser 140 into the magazine 127.

The gripper 129 is substantially identical with the gripper 65 in the previously described embodiment except that the gripper 129 is provided with radially extending tang portions 142 and 143 on its lower end, and these tang portions are in contact with the lower end of the rotatable sleeve 126 when the gripper 129 is at the upper limit of its movement as illustrated in the figures. The gripper 129 also differs from the gripper 65 in being provided with a laterally extending tang portion 144 adjacent to the other end of the gripper and formed on the anvil portion 145 of the gripper. Otherwise the gripper 129 is substantially identical with the gripper 65 and includes the anvil portion 145 corresponding to the anvil portion 98, a bridging portion 146 corresponding to the bridging portion 99, a toothed jaw portion 147 corresponding to the jaw portion 100, a bridging tang portion 148 corresponding to the tang portion 101 and having a flat end 149 with a circular outer end surface 150.

The guide element 130 corresponds generally with the guide element 66 in the previously described embodiment and takes the place of the guide element 66 and the gripper bracing element 68. The guide element 130 is provided with a cylindrical portion 151 that extends to the lower end of the rotatable sleeve 126, a tapered or conical portion 152 and a cylindrical tip portion 153. A slot 54 is cut in the guide element 130, and the slot is defined by side surfaces 155 and 156 and by end surfaces 157 and 158. The guide element 130 is provided with an inwardly tapering surface 159 on its upper end which corresponds with the surface 80 in the previously described embodiment and forms the bottom of the magazine 127.

The guide element 130 extends through the lower tapered tip portion 134 of the barrel 125, with its cylindrical portion 153 passing through the cylindrical opening 135 in the barrel 125, and the guide element 130 has a tapered tip 160 which forms a continuation of the tapered tip portion 134 of the barrel 125. The guide element has an annular rim or boss portion 161 formed on it, and the portion 161 is in contact with a shoulder 162 formed within the tapered tip portion 134 of the barrel 125 for limiting the movement of the guide element 130 downwardly within the barrel 125.

The lead stick carrying tube 131 is quite similar to the corresponding tube 67 in the previously described embodiment and differs from the tube 67 principally in being longer and in taking the place of the pencil tip 61. The tube 131 is provided on its lower end with three slits 163 so as to provide three lead gripping jaws 131a, 131b, and 131c. These jaws correspond to the jaws 61a, 61b, and 61c in the previously described embodiment and function in the same manner to grip the lead sticks at the writing point of the pencil.

The guide element 130 is provided with a cylindrical bore 164 for receiving the lead stick carrying tube 131 and the tube 131 has a drive fit with the walls of the bore 164. The bore 164, for the length of the slot 154, has only a half cylindrical surface in view of the fact that the slot 154 is wider than a half diameter of the bore 164 as is apparent from FIGS. 21 to 24. The tube 131 is provided with opposite slots 165a and 165b, and these correspond with the slots 96a and 96b in the lead carrying tube 67 of the prior described embodiment. The relationship of sides of the slots 165a and 165b with the surface 155 is the same as that of the surfaces 97a and 97b with respect to the surfaces 84 and 85 in the prior described embodiment. The guide element 130 is provided with an opening 166 at the lower end of the magazine 127, and the opening 166 is in communication with and is in alignment with the bore through the tube 131, with the diameter of the opening 166 being just slightly less than the internal diameter of the tube 131 for the same purposes as has been described in connection with the bore 90 of the tube 67 and the opening 78 in the prior described embodiment.

The anvil portion 145 and the toothed portion 147 of the gripper 129 extend through the slots 165a and 165b in the same manner as the portions 98 and 100 of the gripper 65 extend through the slots 96a and 96b, and the tang portion 144 overlies the upper surface of the lead carrying tube 131 and assures that the upper end of the anvil portion 145 cannot enter into the bore of the tube 131 an undue distance. It will be observed from FIGS. 21 and 23 that the width of the slot 154 and the position of the surface 156 of the guide element 130 are such that side surfaces of the bridging portion 146 and of the bridging tang portion 148 are in contact with the surface 156, and the portions 146 and 148 are thus guided and supported by the surface 156.

The spring 132 takes the place of the spring 69 in the previously described embodiment. The spring 132 is a conical spring and has its large diameter end bearing on the radially extending tang portions 142 and 143 of the lead gripper 129 and has its small diameter end bearing on the annular rim portion 161 of the guide element 130. The diameter of the spring 132 at its upper end is just slightly less than the diameter of the cylindrical cavity 136 in the barrel 125, and it therefore is apparent that the spring 132 is centered in its location both at its upper and lower ends.

The clip 133 is, in general, a resilient metal strip of rectangular cross-section bent back upon itself to have opposite leg portions 167 and 168; and, in disassembled position, these portions 167 and 168 are substantially in contact due to the spring action of the clip 133. A nib 169 is fastened to the end of the leg portion 167 for holding the leg portion 167 substantially in parallel relationship with the exterior surface of the barrel 125, and the leg portion 168 is provided with an outwardly extending boss portion 170. The barrel 125 is provided with a notch 171 on its upper edge and is provided with a longitudinally extending slot 127 within its cavity 136 and is also provided with an opening 173 through the barrel 125 in communication with the slot 172. The clip 133 extends through the notch 171, and the leg 168 of the clip 133 extends downwardly through the barrel 125 within the slot 172 and within the peripheral groove 138 of the rotatable sleeve 126, with the boss portion 170 of the leg 168 extending outwardly through the opening 173 in the barrel 125.

In operation, this embodiment of the invention functions in substantially the same manner as the embodiment shown in FIGS. 8 to 18. The rotatable element 126 is turned in order to cause the gripper 129 to grip lead sticks 128 and propel them through the lead tube 131 downwardly through the pencil and through the stick gripping jaws 131a, 131b, and 131c. This movement of the gripper 129 is against the action of the spring 132; and the spring, due to the arrangement of parts, provides because of its force a strong gripping action on the lead sticks 128. When the tang portion 148 of the gripper 129 reaches the end of the helical slot 137, the slot 137 is so constructed as to simultaneously move the tang portion 148 out of the slot and at the same time cause the toothed portion 147 to disengage with respect to a lead stick 128 within the tube 131, and the spring 132 moves the lead gripper 129 back to its initial position in which it is illustrated in the figures. Continued rotary movement of the element 126 causes a re-engagement of the lead sticks by means of the toothed portion 147, and still additional rotary movement of the sleeve 126 causes further movement of the lead sticks 128 toward the tip of the pencil.

The pencil may be assembled by first assembling the lead tube 131 in its proper position with respect to the guide element 130; and, due to the friction fit of the tube 131 in the guide element 130, the tube 131 remains in its proper position in the guide element. The spring 132 may then be assembled onto the guide element 130, with its lower end in engagement with the rim portion 161. The gripper 129 may be positioned in the slot of the guide element 130 and is sprung open slightly as the tube 131 is put into position in order to properly position the gripper 129.

The rotary sleeve 126 is then slid onto the cylindrical exterior surface 151 of the guide element 130; the clip 133 is put into the peripheral groove 138 of the sleeve 126 and the assembly as so far completed is moved downwardly and inwardly into the barrel 125. The boss portion 170 slides within the internal longitudinally extending slot 172 within the barrel 125; and, due to the springiness of the clip 133, the boss portion 170 extends downwardly into the opening 139 until the boss portion 170 reaches the opening 173 with continued movement of these parts into the barrel 125. The boss portion 170 then snaps outwardly into the opening 173 to lock the clip in place on the barrel 125, and the leg portion 168 of the clip 133 in fitting within the groove 138 of the rotary sleeve 126 holds the sleeve 126 from longitudinal movement in either direction within the barrel 125 and thereby holds the other parts of the pencil, including the gripper 129 and spring 132, in their proper positions particularly against the expansive force of the spring 132. The cylindrical portion 153 of the guide element 130 has a drive fit within the cylindrical opening 135 of the housing 125 so that there is no tendency for the guide element 130 to rotate within the barrel 125 during operation of the pencil by rotary movement of the sleeve 126. The clip 133 also functions in the usual manner, with its outer leg 167 causing the tang portion 169 to bear downwardly with resilient action toward the exterior surface of the barrel 125 so that the pencil may be inserted into the user's pocket, and the nib 169 bears against the exterior surface of the pocket and holds the pencil within the pocket.

The last described two embodiments of the invention shown in FIGS. 8 to 25 advantageously allow the rotatable manually operated elements 62 and 126 to be rotated a plurality of turns while still propelling lead sticks through the pencil during nearly the full rotation. As with the first described embodiments shown in FIGS. 1 to 7, the latter two embodiments also provide an engagement force on lead sticks in the bore of a lead carrying tube which is dependent on in magnitude and is increased by the force from a spring; and the spring has, as another function, the return of the lead gripping device back to its initial retracted position. The anvil portions 98 and 145 as well as the spline 40 in the first described embodiments are not moveable radially in the pencil and thus prevent breakage of lead sticks that might otherwise occur if movable gripping devices on both sides of the lead sticks were used.

I wish it to be understood that the invention is not to be limited to the specific constructions and arrangements shown and described, except only insofar as the claims may be so limited, as it will be understood to those skilled in the art that changes may be made without departing from the principles of the invention. In particular, I wish it to be understood that the above abstract of the disclosure shall not be considered in any way to limit the scope of the claims.

I claim:

1. A pencil comprising an exterior barrel having a tip through which sticks of writing lead may be propelled, means providing a duct for lead sticks extending to said tip, a lead gripping device moveable longitudinally of the pencil, said gripping device having first and second portions between which there may be relative movement and being energized to grip a lead stick in said duct when a force is applied to said first portion tending to move it in a retracting direction away from said tip and when said second portion is held from movement in said retracting direction, manually operated means accessible from the exterior of the pencil and effective on said second portion for moving said gripping device in a stick propelling direction toward said pencil tip and for holding the gripping device from movement in the retracting direction, and a spring effective on said first portion tending to move said gripping device in the retracting direction so as to cause the gripping device to grip a lead stick in said duct with spring derived force when said manually operated means is effective on said first portion to move said gripping device in a stick propelling direction or to hold the gripping device from retracting movement.

2. A pencil as set forth in claim 1, said manually operated means being effective on adjustment to release said gripping device for movement in a retracting direction and said spring being effective to move the gripping device in the retracting direction when said manually operated means is so adjusted, said gripping device including resilient means for allowing disengagement of the gripping device with respect to a lead stick in said duct when said gripping device so moves in the retracting direction.

3. A pencil as set forth in claim 1, said gripping device comprising a jaw of resilient material and connected to said second portion and arranged to move into and out of said duct due to bending of the jaw and said manually operated means comprising a rotatable element having a surface gradually advancing longitudinally of the element and effective on said second portion and tending to move the jaw in a stick propelling direction as the rotatable element is rotated.

4. A pencil as set forth in claim 2, and including a magazine for sticks of lead in said barrel positioned in the end of said barrel remote from said tip, and said duct providing means comprising a tube connecting said magazine and said tip.

5. A pencil as set forth in claim 4, said tube having a slot therein and said gripping device comprising a jaw of resilient material connected to said second portion and arranged to move within said slot and into and out of said duct due to bending of the jaw and said manually operated means comprising a rotatable sleeve protruding from the end of the pencil remote from said tip for manual operation and having a surface gradually advancing longitudinally of the sleeve and effective on said second portion so as to thereby tend to move the jaw to a stick propelling direction as the sleeve is rotated.

6. A pencil as set forth in claim 5, said tube having a second slot therein opposite said first mentioned slot and said gripping device comprising also an anvil portion moveable longitudinally with respect to said tube and along with said jaw and extending into said second slot and into said duct so that a lead stick is gripped between said anvil portion and said jaw.

7. A pencil as set forth in claim 6, said gripping device comprising a carriage portion slidable on and with respect to said tube and constituting said first portion on which said spring is effective, said jaw being connected to said carriage portion at a place remote from said tip and said gradually advancing surface being effective on a portion of said jaw at a place closer to said tip so that said jaw bends inwardly into said duct to engage a lead stick.

8. A pencil as set forth in claim 7, said jaw being provided with an outwardly extending lug portion constituting said second portion and on which said gradually advancing surface is effective, and said carriage portion having an outwardly extending tang adapted to be contacted by said gradually advancing surface for temporarily arresting said gripping device in a retracting movement under the action of said spring as said rotatable sleeve is turned to release the gripping device for retracting movement, said jaw being resiliently biased to spring outwardly to cause disengagement of said gripping device when the gripping device is temporarily arrested.

9. A pencil as set forth in claim 2, and a plurality of balls loosely disposed in cylindrical cavities extending into said duct, said cavities extending downwardly at acute angles with respect to the longitudinal center of said duct when the pencil is vertically disposed with said tip up so that one or more said balls moves inwardly and into said duct under gravity so as to grip a lead stick therein as the pencil is moved from a vertical position into a horizontal position.

10. A pencil comprising an exterior barrel having a tip which through which sticks of writing lead may be propelled, a tube providing a duct for lead sticks extending to said tip, a gripping device movable longitudinally of the pencil and arranged to grip a lead stick in said duct, said gripping device comprising a part movable longitudinally with respect to said tube and extending a fixed distance into said duct, said gripping device comprising also a jaw disposed on the opposite side of said duct with respect to said part and moveable toward said part so as to grip a lead stick between the jaw and the said part, and manually operated means accessible from the exterior of the pencil for moving said gripping device in a stick propelling direction toward said pencil tip and for at the same time forcing said jaw toward said part to grip a lead stick in said duct.

11. A pencil as set forth in claim 10, said tube having a pair of opposite slots in it through which said part and said jaw extend, said jaw being made of a resilient material and having said manually operated means effective on the jaw so that the jaw is forced toward said part to grip a lead stick due to the bending of the resilient material of the jaw as the manually operated means is adjusted to move said gripping device toward said tip, and a spring tending to oppose the movement of said gripping device in a lead propelling direction toward said tip so as to augment the gripping force of said jaw on a lead stick in said duct.

12. A pencil comprising an exterior barrel having a tip through which sticks of writing lead may be propelled, a lead stick carrying tube having a lead stick carrying duct therein connected to said tip and having a pair of opposite longitudinal slots therein, an anvil portion moveable longitudinally in one of said slots and extending slightly into said duct, a jaw longitudinally moveable in the other slot and connected with said anvil portion as to move longitudinally of the pencil along with said anvil portion, a spring tending to move said jaw and anvil portion in a retracting direction away from said tip, a tang portion connected to said jaw and extending around said tube to the side of the tube remote from the slot in which said jaw is disposed, said jaw having a resilient portion remote from said tang portion so as to moveable into and out of said duct, and a manually rotatable element within said barrel and having and having a helical surface thereon effective on said tang portion whereby to bend said jaw in its said resilient portion to thereby engage a lead stick in said bore between said jaw and said anvil portion as the jaw and anvil portion are moved toward said tip against the action of said spring by rotation of the manually rotatable element.

13. A pencil as set forth in claim 12, said helical portion being formed by a helical slot in said manually rotatable element and said slot extending for a plurality of revolutions in said manually rotatable element.

14. A pencil as set forth in claim 12, said anvil portion and said jaw and said tang portion being formed out of a single piece of resilient sheet material and said single piece including a portion extending around said tube to connect said anvil portion and said jaw.

15. A pencil as set forth in claim 13, said slot terminating at its lower end closest to said tip with a slot portion that narrows so as to force said tang portion out of the slot to thereby move said jaw out of said duct and to cause said spring to return said tang portion to the other or beginning end of said slot preparatory to an active stroke of the jaw back toward said tip.

16. A pencil as set forth in claim 15, said resilient portion of said jaw resiliently urging said tang portion into said slot, said manually rotatable element constituting a sleeve, and said tang portion having a curved end in contact with the inner surface of said sleeve as said jaw makes its retracting movement under the action of said spring with the curved end tending to keep the tang portion out of said slot on the retracting movement.

17. A pencil as set forth in claim 15, said resilient portion of said jaw resiliently urging said tang portion into said slot and said manually rotatable element constituting a sleeve, said slot having outwardly flaring sides in an intermediate portion thereof and said tang portion having correspondingly outwardly flaring sides so as to tend to hold said tang portion in said slot.

18. A pencil as set forth in claim 12, and a guide element fixed with respect to said lead stick carrying tube and said exterior barrel and having a surface extending longitudinally of the tube and barrel with which said tang portion makes contact and which braces the tang portion as the tang portion is acted on by said helical surface as said rotatable element is rotated to move said jaw and anvil portion toward said tip.

19. A pencil as set forth in claim 18, said guide element having an inwardly tapering surface on its end remote from said tip and said manually rotatable element constituting a sleeve that protrudes from the end of said barrel remote from said tip and said inwardly tapering surface and the inner surface of said sleeve providing a lead stick magazine, said inwardly tapering surface having an opening therethrough in communication with the end of said tube remote from said tip so that lead sticks may feed from the magazine into said tube.

20. A pencil as set forth in claim 19, said tip being separable from the remainder of said barrel and the tip and said guide element including screw threads for fastening them together so that the guide element and tip are fixed with respect to the remainder of said barrel.

21. A pencil as set forth in claim 12, and a guide element fixed with respect to said lead stick carrying tube and said exterior barrel and having a slot therein extending longitudinally of the tube and barrel for providing surfaces for bracing the two opposite sides of said tang portion as said jaw and anvil portion are moved by rotation of said manually rotatable element.

22. A pencil as set forth in claim 18, said barrel having a tapered tip portion and said guide element extending through and protruding from the tapered tip portion and said tube extending through and protruding from the guide element so that the tapered tip portion of the barrel and an end of the guide element and an end of the tube form said barrel tip through which sticks of writing lead may be propelled.

23. A pencil as set forth in claim 18, said spring being in conical form with its large diameter end being in slidable contact with the interior surface of said barrel and in engagement with said jaw and anvil portion, said barrel being tapered at its tip end and the other end of the spring extending into the tapered end of the barrel.

24. A pencil as set forth in claim 22, said spring being in conical form with its large diameter end being in slidable contact with the interior surface of said barrel, said barrel being tapered on its tip end and the small diameter end of said spring being disposed on a peripheral boss portion on said guide element located in the tapered tip portion of said barrel.

25. A pencil as set forth in claim 1, said manually operated means comprising a sleeve rotatably disposed in said exterior barrel, and a pocket clip strip extending from the exterior surface of said barrel and into the end of the barrel remote said tip and fixed from longitudinal movement with respect to the barrel and being in contact with a peripheral shoulder formed on said sleeve for holding the sleeve within the barrel as the sleeve is rotated.

26. A pencil as set forth in claim 10, said manually operated means comprising a sleeve rotatable disposed in said barrel and protruding from the end of the pencil remote from said tip for manually operation, a spring within said barrel yieldably opposing the movement of said gripping device in a stick propelling directon, and a pocket clip strip extending from the exterior surface of said barrel and into the end of the barrel remote from said tip and being fixed from rotation with respect to the barrel and extending into a peripheral groove formed in said sleeve so as to hold the sleeve within the barrel against the action of said spring as the sleeve is rotated.

References Cited

UNITED STATES PATENTS

| | | | |
|---|---|---|---|
| 1,720,417 | 7/1929 | Hasselquist | 401—65 |
| 1,906,851 | 5/1933 | Hasselquist | 401—65 |
| 1,908,386 | 5/1933 | Wahl | 401—65 |
| 2,210,845 | 8/1940 | Wahl | 401—65 |
| 2,452,905 | 11/1948 | Collura | 401—65 |

LAWRENCE CHARLES, *Primary Examiner.*